Oct. 1, 1957 L. M. PASCAL ET AL 2,807,914
SHARPENING-MACHINE TO GRIND OR TO SHARPEN TANGED
FILES, MILLING PLATES OR SIMILAR TOOLS
INCLUDING A TOOTHED ARC
Filed Dec. 27, 1954 5 Sheets-Sheet 4

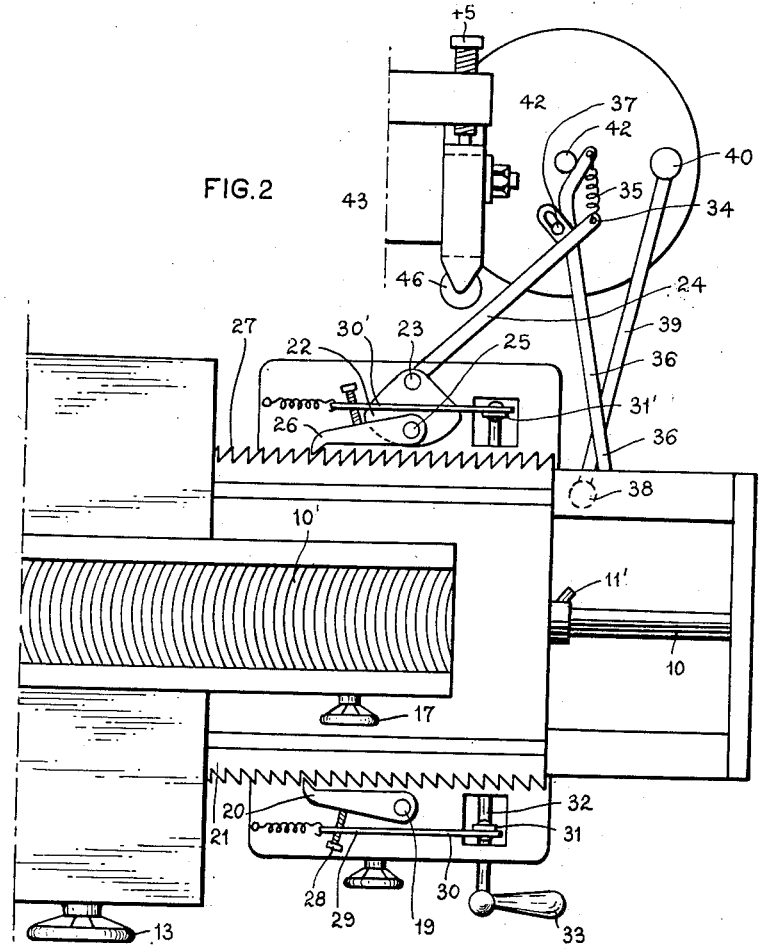
FIG. 2
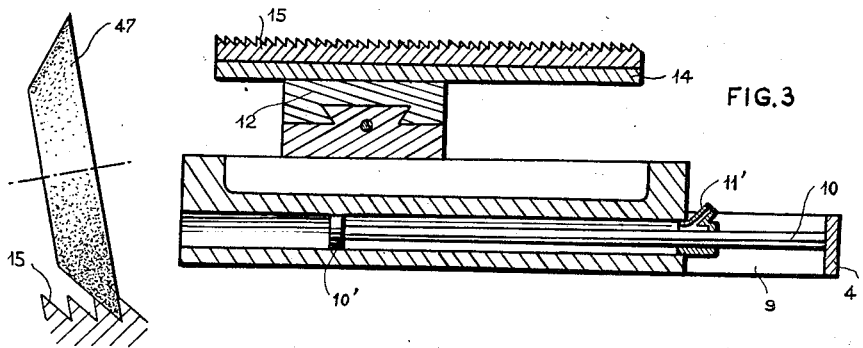
FIG. 9
FIG. 3
INVENTOR
LOUIS MARCEL PASCAL
JOSEPH FIRMIN PASCAL
ATTORNEY

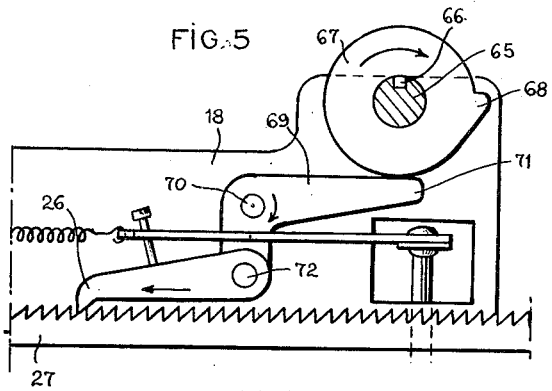
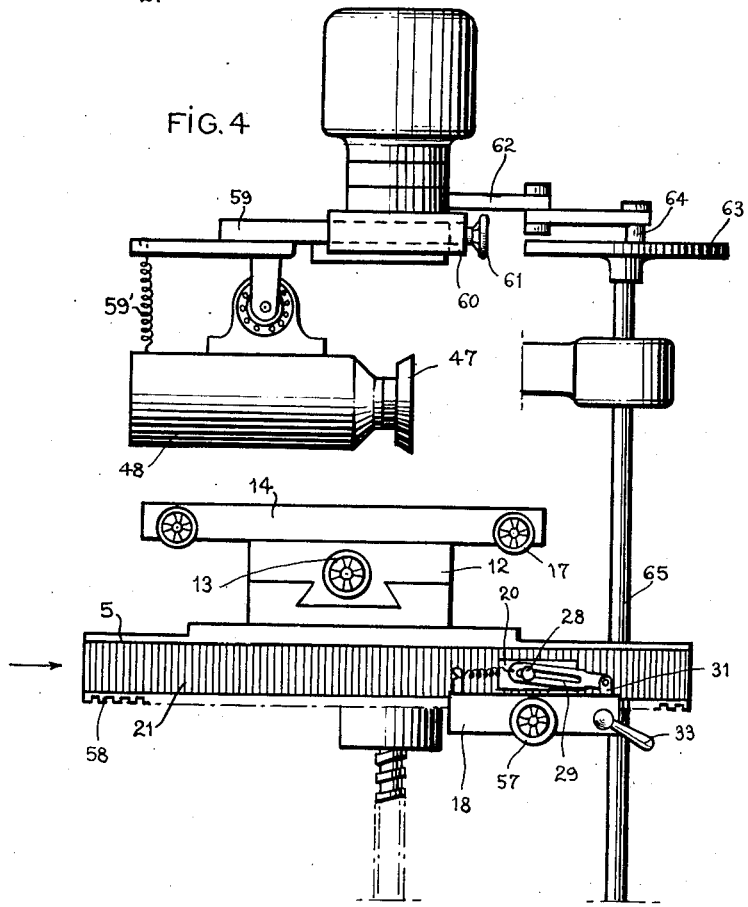

Inventors:
Louis Marcel Pascal
and Firmin Joseph Pascal
By: Edward F. Jurow
Atty

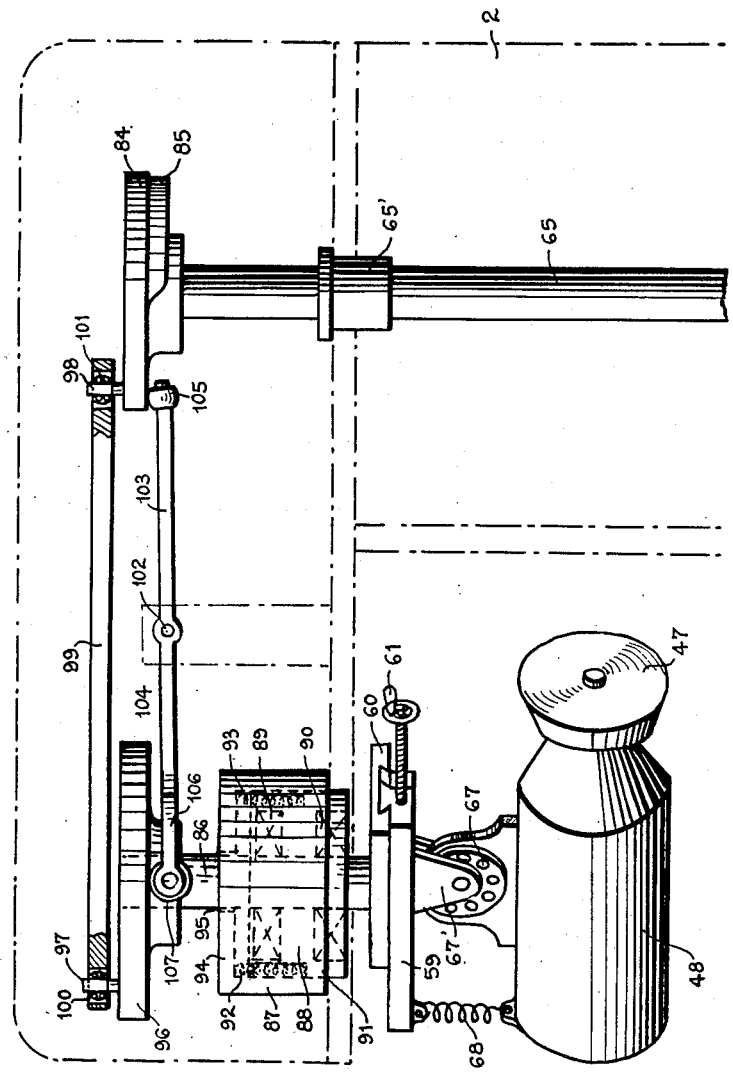

United States Patent Office 2,807,914
Patented Oct. 1, 1957

2,807,914

SHARPENING-MACHINE TO GRIND OR TO SHARPEN TANGED FILES, MILLING PLATES OR SIMILAR TOOLS, INCLUDING A TOOTHED ARC

Louis Marcel Pascal, Plessis-Trevise, and Firmin Joseph Pascal, Paris, France

Application December 27, 1954, Serial No. 477,704

Claims priority, application France December 30, 1953

4 Claims. (Cl. 51—33)

In some industries, particularly in the motor car industry and in the coach-building industry, files having arcuate teeth are used. These files are either flat files, mounted in that case on a special holder—they are then called milling plates—or tanged files, provided with a wooden handle.

Up to now, these files, when worn out, were thrown away after a first cleaning because they became perfectly unserviceable as soon as the teeth had lost their bite.

Some devices have already been recommended to sharpen anew this type of file, but the difficulties encountered in attempting this operation led to a failure.

The present invention relates to a machine permitting the grinding of flat files having arcuate teeth, without any other manual operation than an initial adjustment of the file with respect to the grinding wheel.

The machine is characterized in that the file and the grinding wheel are respectively supported by two members the distance of which is adjustable along the axis of the file, that one of the members is supported by a rocking shaft passing through the center of curvature of the tooth to be ground and that the member supporting the file is provided with a self-acting device advancing the file, step by step.

According to one form of embodiment, the file carrier is stationary and the grinding wheel is mounted on the rocking shaft.

By way of example, different forms of embodiment of a machine according to the invention are described hereafter with reference to the annexed drawing in which:

Figure 2 is a plane view of the machine of Figure 1, as viewed from the grinding wheel.

Figure 3 is a section along line V—V, of Figure 2.

Figure 4 illustrates diagrammatically the essential parts of a machine according to the second form of embodiment.

Figure 5 is a plan view diagrammatically showing a part of the self-acting stepping device.

Figure 8 illustrates diagrammatically another form of embodiment of the device controlling the rocking of the grinding wheel casing and its periodical lifting.

Figure 9 illustrates the position of the wheel relative to the file.

Figure 1:
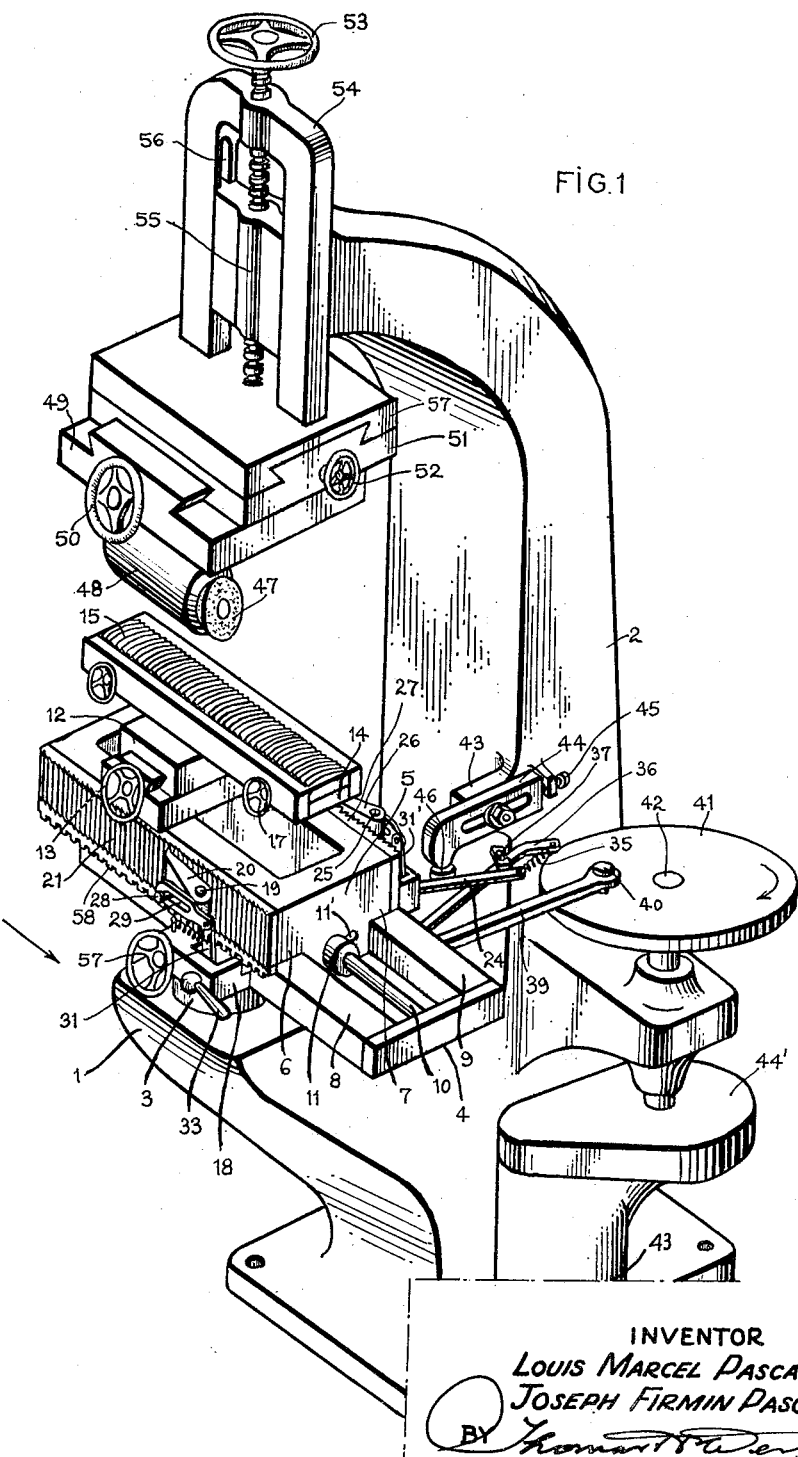
Figure 1 is a perspective view showing a first form of embodiment of the sharpening machine.

The machine illustrated in Figure 1 is a machine in which oscillating motion is imparted to the file with respect to the stationary grinding wheel.

On the bracket 1 of the stand 2, a trunnion 3 is provided which constitutes the pivot for a frame 4 in which a longitudinal frame 5 slides upon shoulders 6, 7 resting on the sides 8, 9, of the frame 4. A stem 10 is set upon the frame 4; the stem 10 bears a piston 10' movable in a cylinder 11 provided with a coupling for the admission of a fluid under pressure, and the object of which will be described hereafter.

On the upper face of the longitudinal frame 5 is fixed a transverse carriage 12, the position of which can be adjusted by means of the hand-wheel 13, in a way known per se. A file-carrier 14 is set, by suitable means, on the transverse carriage 12; the file or milling plate 15 is tightened between the cheeks of this file-carrier by means of the hand-wheels 16, 17. Under the frame 4 is transversely set a bracket 18 extending on both sides over the parts 8, 9 of the frame 4. On the front part of the bracket 18 is pivoted at 19 a pawl 20 resiliently engaging, under the action of a suitable spring (not shown), a rack 21, the teeth of which have the same pitch as those of the file 15.

On the rear part of the same bracket 18 is disposed a cam 22 rotatively mounted on an axis 23 trunnioned in the bracket 18 and upon which is keyed a stem 24. On the same cam 22 is fixed an axis 25 upon which is pivoted a second pawl 26, resiliently engaging under the action of a spring (not shown), the teeth of a rack 27, identical with the rack 21.

The pawls 20 and 26 bear each a stud, 28, 28' respectively engaged in grooves 29, 29' provided in levers 30, 30', supported by vertical arms 31, 31', integral in rotation with a transverse shaft 32 controlled by the rotation of the handle 33. By lowering this handle 33 (see Figure 1), the levers 31, 31', are moved towards the left and the pull exerted by the bottoms of the grooves 29, 29' on the studs 28, 28', thrusts the pawls 20, 26, away from the racks 21, 27, respectively, so as to allow the operator to make a first axial adjustment of the longitudinal frame 5.

The free end of the lever 24 is connected at 34, by means of the spring 35, with a flat stem 36 integral with the frame 4 and upon which the stem 24 can move against the action of the return spring 35, as it will be explained later on. In the retracted position of the spring 35, the stem 24 bears against an adjustable abutment 37 provided on the stem 36.

On the frame 4, preferably at the lower face of its lateral side 9, is hinged at 38 a crank 39, hinged at its other end on a plate 41, keyed on a shaft 42. This shaft 42 is driven by a motor 43, through a speed reducer 44'. One sees that when the plate 42 rotates in the direction of the arrow F (see Figure 2), the frame 4 and all the elements mounted thereon will oscillate around the trunnion 3.

The stand 2 offers on its upright a projection 43 carrying a grooved slide 44 transversely adjustable by suitable means such as an adjustment screw 45. On its front part, the slide 44 bears a roller 46 rotatably mounted thereon.

Reference 47 designates the grinding wheel; the motor of this grinding wheel is suspended by its casing 48 on the slide 49 adjustable, by means of the hand wheel 50, with respect to the slide 51 which in its turn is adjustable by means of the hand-wheel 52, with respect to a plate 57. The assembly of the two slides 49 and 51 and of the plate 57 can be vertically adjusted by means of the hand-wheel 53 passing through the stirrup 54 and the head 55 engaging lateral grooves such as the grooves 56 in the legs of the stirrup to which is fixed the assembly of the two slides 49 and 51 and of the plate 57.

The operation of the machine is as follows:

When the file 15 has been placed in the file-carrier 14 and fixed in this position between the side cheeks, by means of the hand-wheels 16 and 17, the grinding wheel casing 48 is lowered so that the grinding wheel 47 will contact a curved tooth of the file 15 and to secure an accurate contact between the grinding wheel and the tooth to be ground, the final adjustment is carried out by means of the transverse slide of the file-carrier 13, and of the hand-wheels 50, 52 of the transverse and longitudinal slides of the grinding wheel casing. This adjustment is preferably carried out for a point of contact located on the longitudinal axis of the file 15.

The adjustment being carried out so that the distance between the axis of the trunnion 3 and the point of contact of the grinding wheel with the tooth to be ground is equal to the radius of curvature of this tooth, and the motor 43 being started, an oscillating movement is imparted to the frame 4, the grinding wheel being carried along on arc of a circle centered on the axis of the trunnion 3, the radius of said circle being equal to the radius of curvature of the tooth to be ground.

It will be admitted that the frame 4 moves first towards the position B, indicated in dotted lines and, thereafter, towards the position C; when the frame 4 reaches the end of its movement towards the position C, the stem 24 bears against the roller 46, and this roller moves the stem 24 or exerts an effort on said stem to rotate it clockwise, thus rotating also the cam 22 clockwise. During the rotation of the cam 22, the pawl 26 is pushed towards the left and as it engages a tooth, this pawl transmits the thrust received from the cam to the longitudinal frame and thereby to the file-carrier 14. It is plain that the displacement of the carriage carrying the file-carrier towards the left in Figure 2 must take place after the grinding wheel has passed laterally beyond the corresponding end of the ground tooth, and this requirement is met by adjusting the moment of the contact of the roller 46 with the stem 24, by means of the adjustment screw 45. The axial movement towards the left of the file-carrier 14 must correspond to the pitch of a tooth, to enable thereby the grinding wheel to grind the next tooth when the carriage moves from C towards D. This requirement is met, on the one hand, by the adjustment of the angular motion of the cam 22 and on the other hand by the distance between the axis 23 upon which is keyed the stem 24 and the axis 25 upon which the pawl 26 is journaled.

While the longitudinal carriage 12, together with the file-carrier 14 moves towards the left for a distance equal to the pitch of the teeth of the file, the pawl 20 slides over the tooth in which it was engaged and enters the next tooth since it is permanently pressed by elastic means against the rack 22. To secure a correct position of the tooth in which nose of the pawl 20 in the bottom of the tooth in which it is engaged, the longitudinal frame 5 undergoes permanently an elastic stress exerted in a direction which is such that the bottoms of the teeth in which are engaged the pawls 20 and 26 are permanently applied against the file ends of these pawls. This is accomplished, for instance by means of a spring or, according to an alternate embodiment, by the introduction in the cylinder 11, through the coupling 11', of a fluid under pressure, such as compressed air which, acting upon the right face of the piston 10', tends to move the frame 5 towards the right in Figure 2.

When after the displacement of the longitudinal frame 5 for an axial distance equal to the pitch of a tooth, the frame 4 starts moving from its position C to its position B, the stem 24, which has been shifted towards the frame 4 tends, under the action of the return spring 35 to come back to its initial position, as shown in Figure 2. During this backwards movement, the stem 24 rotates the cam 22 counterclockwise and brings the nose of the pawl 26 in the next tooth, the same movement, tooth by tooth, taking place each time the frame 4 undergoes in the position C the reversing of its oscillating movement.

When all the teeth of the file are ground anew or if, for a particular reason, it is desired to grind anew all the teeth or only some of them, the motor 43 is stopped, the pawls 20 and 26 are disengaged from their respective racks, by lifting of the lever 33 and by rotating the hand-wheel 57; this hand wheel 57 is journaled in the bracket 18 and carries a pinion (not shown), meshing with teeth 58 provided on the lower part of the rack 21.

In order that the grinding wheel contacts without any stiffness the successive teeth to be ground, it is advisable to provide the casing of the grinding wheel with an elastic suspension on the transverse slide 59, for instance as it has been diagrammatically illustrated in Figure 4, in which is partially shown a form of embodiment of the machine according to the invention, in which the file grinding is stationary, the carrier wheel casing receiving an oscillatory motion.

In the form of embodiment of Figure 4, the longitudinal frame 5, supporting upon its lateral faces the racks 21 (and 27 not shown) and the file-carrier 14 on its transverse carriage 12, is identical with the frame of the machine illustrated in Figure 1, with the difference that it is not mounted rotatably. In Figure 4, the grinding wheel casing 48 is suspended with the interposition of a bearing 48' on a slide 59 axially adjustable in a guideway 60 by means of an adjustment hand-wheel 61, said casing 48 being subjected to the action of a spring 59' fixed also on the slide 59 to supply an elastic suspension for the said casing. The guideway 60 is carried by a trunnion 60' pivotally supported by a stationary head 61' of the machine. On the trunnion 60' is hinged a crank, generally designated 62, which is also hinged on a plate 63 through a pin 64. The plate 63 is rotated by the shaft 65 which forms an extension of the shaft 42 of Figure 1. On the shaft 65 (see Figure 5) is keyed at 66, a cam 67 having at 68 a nose, said cam constituting for this form of embodiment of the machine the device controlling the stepping of the longitudinal carriage 5 and thereby of the file carrier 14. This device for the control of the stepping includes, as it is apparent from the Figure 5, a cranked lever 69 pivoted on a pin 70 supported by the bracket 18. The end 71 of the cranked lever bears continuously against the cam 67 and its other end carries a pin 72 upon which is pivoted the pawl 26. When the cam 67 rotates clockwise, its nose 68, when it engages the end 71 of the cranked lever 69, causes clockwise rotation of this lever and the axial displacement towards the left of the lever 26 which drives along, for the required distance, the rack 27 and thereby the file-carrier 14. When the nose 68 has passed the end 71 of the cranked lever 69, this lever returns into its initial position and so does the pawl 26 which is now engaged in another tooth through which it will later on impart a new thrust towards the left to the rack 27 and thereby to the file-carrier 14.

In the two forms of embodiment above described, the grinding wheel rotatably mounted in the casing 48 which is adapted to oscillate, grinds a same curved tooth during a complete oscillation of the casing, consequently as well during the forward movement as during the return movement thereof.

During one of these movements, the grinding, if the direction of rotation of the grinding wheel is not the same as the direction of the movement of the casing of the grinding wheel at the point of engagement with the tooth to be ground, is not well accomplished inasmuch as the yieldingly suspended grinding wheel casing tends to rise up and the grinding wheel becomes jumpy over the tooth to be ground, so that the edge runs the risk of being destroyed. On the contrary, during the half-oscillation in the opposite direction, the grinding wheel engages boldly the tooth and has a tendency to "stick" to it, securing thereby a correct grinding.

Figure 6:
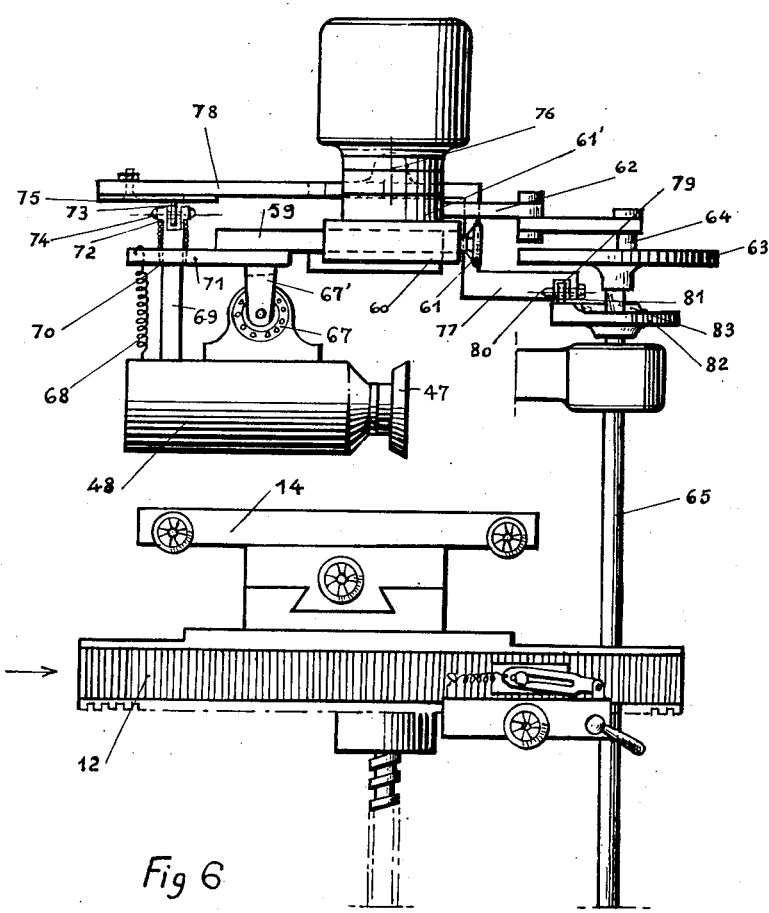
Figure 6 shows a modification of the embodiment according to Figure 4.
Figure 7:
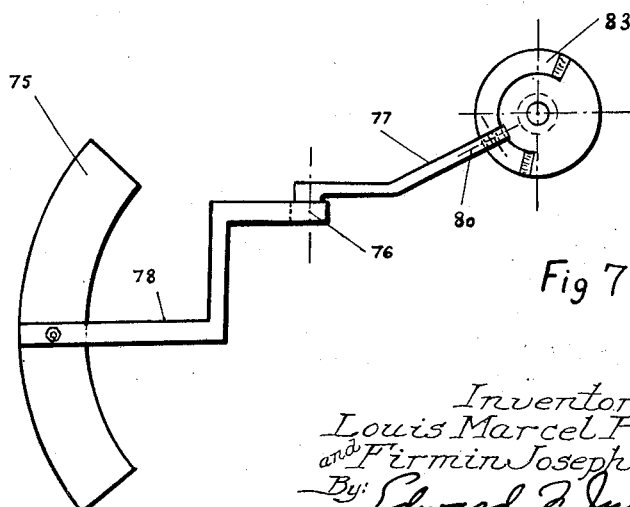
Figure 7 is a plane view showing a part of Figure 6.

The form of embodiment according to Figures 6 and 7 comprises means for lifting the casing of the grinding wheel during one-half of each complete oscillation.

Preferably, this means is advantageously constituted by a two armed lever journalled upon the body of the machine or upon a stationary part thereof; one of the arms of this lever bears upon a stem integral with the casing of the grinding wheel whereas the other arm is actuated by a cam, preferably mounted on the shaft controlling the oscillation of the trunnion and disposed to bring about the tilting of this lever in the direction of the moving apart of the grinding wheel from the file.

In Figure 6, numeral 48 designates the casing of the grinding wheel which is yieldingly suspended from a slide 59 axially adjustable in a guideway 60 by means of an adjustment hand-wheel 61. The guideway 60 is supported by a trunnion 61' upon which is hinged a crank, generally designated by 62, said crank being otherwise hinged on a plate 63 through a pin 64. The plate 63 is driven in rotation by the shaft 65, which constitutes an extension of shaft 42 of Figure 1.

The file-carrier is disposed under the casing of the grinding wheel, the numeral 21 generally designating the rack of the device controlling the stepping of the file, above described in detail with reference to Figures 4 and 5.

The grinding wheel 47 is rotatably disposed in a casing 48 which is pivoted by means of a bearing 67, between the cheeks of a fork-shaped element 67' fixed upon the extension 71 of the slide 59. On this extension is fixed a tension spring 68 the other end of which is fixed to the casing 48 which is thus tilted towards the file-carrier 14, the grinding wheel becoming thereby capable of bearing resiliently on a file (not shown). The grinding wheel casing 48 is provided with a stem 69, passing freely through a bore 70 in the extension 71 of the slide 59 and provided with a slotted flange 72 in which is journaled a roller 73; a spring is fitted on the upper part of the stem, bearing, on the one hand, upon this extension 71 and, on the other hand, on the border 74 of the flange, so that the roller 73 will contact the element 75 which shall be described hereafter.

On the body (not shown in Figure 6, but which is similar to the body 2 of Figure 1) of the machine or on a stationary part thereof is pivoted, on an axis 76, a cranked lever, one arm being designated by 77 and the other by 78. The free end of the arm 77 is provided with a recess 79 in which is journaled, on the spindle 80, a roller 81 capable of running on a plate 82 provided with a cam 83, circular and concentric to the plate 82 (see Figure 7).

The free end of the arm 78 bears a runway 75 in the shape of an arc of circle and fixed on said lever by any suitable means, such as a screw with a sunk head, constituting the runway of the roller 73 during the oscillating movement of the grinding wheel casing, actuated from the plate 63.

The shape and the circumferential length of the cam 83 of the plate 82 keyed on the shaft 65 are such that they correspond to a half oscillation of the grinding wheel casing.

One sees that, under such conditions, the grinding wheel 47 is applied on the file for the grinding of a tooth for a time which corresponds to a half complete oscillation, and is lifted during its return motion since the roller 81 runs on the cam 83.

Advantageously the plate 82 is keyed on the shaft 65 so that the lowering of the grinding wheel casing 48 on the file to be ground will take place when this casing moves in the vicinity of the file in a direction which corresponds to the direction of rotation of the grinding wheel.

In the form of embodiment of Figure 8 which is an alternative form of embodiment of the device described with reference to Figures 6 and 7, the shaft 65 is journaled in a bearing 65' integral with the body of the machine, indicated in dotted lines, said shaft being coupled in a suitable manner to the outer shaft of a speed reducer similar to the reducer shown at 44, Figure 1. The free end of the shaft 65 supports a plate 84, one of the faces of which, for instance the upper face, is plane whereas the lower face bears a peripheral cam 85, similar to the cam 83 of Figures 6, 7.

As in these figures, the grinding wheel casing 48 is mounted by means of a ball bearing 67 on a slide 59, axially adjustable, through a hand wheel 61, with respect to the stationary link, integral with a shaft 86, the spring 68 being also in this embodiment fastened, on the one hand, to the slide 59 and, on the other hand, to the grinding wheel casing 48, to exert on this casing 48 a force tending to rock it in the direction bringing together the grinding wheel 47 and the file-carrier, not shown.

The shaft 86 is journaled in a bearing including a race 87 integral with the body 2 and in which is fitted a sleeve 88 mounted on the shaft 86 by means of two bearings 89 and 90 and including a shoulder 91 against which bear compression springs 92, 93, which, at their other ends, bear upon the bottom 94 of the race, which is bored in its center, at 95, for the free passage of a shaft 86 upon which is mounted a plate 96.

The plates 96 and 84 bear, at different radial distances respectively, two fingers 97 and 98 interconnected by means of swivel bearings 100, 101 and a connecting rod 90, the connection being such that, on account of the different radial distances of the fingers 97, 98, with respect to the corresponding axes of their plates, the uniform circular motion of the plate 84 imparts to the plate 96 a circular alternating motion which is transmitted to the grinding wheel casing 48 through the shaft 86 and the adjustable slide 59.

A two armed lever 103, 104 is pivotally mounted at 102 on the body 2. The right-hand end of the arm 103 bears a roller 105 in contact with the lower face of the plate 84 and located in the path of the cam 85, whereas the end of the arm 104 is terminated by a fork, the arms 106 of which support respectively a roller 107 in contact with the lower face of the plate 96.

As in the embodiment of the Figures 6 and 7, the circumferential length of the cam 85 corresponds to a complete half-oscillation of the grinding wheel casing 48 and the angular adjustment of the plate 84 on the shaft 65 is such that the cam 85 moves under the roller 105 during the half-oscillation of the grinding wheel casing 48 for which, in the vicinity of the grinding wheel 47, is directed in the direction reverse to the rotation of the grinding wheel, the grinding wheel casing being thereby lifted during this half-oscillation unfavorable to the quality of the grinding.

What I claim is:

1. A machine for grinding the teeth of an arcuate-tooth file, comprising a working table, a carriage mounted on said working table, including means for fixing thereon a file to be sharpened, means for advancing step by step said carriage, in combination with a support rotatably disposed above the said carriage, a guide-way integral with said swinging support, a slide adjustably inserted in said guide-way, a downwardly directed fork-shaped projection on said slide, a grinding wheel casing freely suspended in said fork-shaped projection, a grinding wheel rotatably supported in said casing, a tension spring acting on said grinding wheel casing to swing said casing in a direction for resiliently applying the grinding wheel against a file to be fixed on the carriage, means for swinging the support and thereby oscillate said grinding wheel on an arc conforming to the arc of the teeth of the file to be fixed on the casing, and means for lifting the carrier and the grinding wheel for a period corresponding to that of one half of each complete swinging movement of the support.

2. A machine for grinding the teeth of an arcuate-tooth file, comprising a working table, a carriage mounted on said working table, including means for fixing thereon a file to be sharpened, means for advancing step by step said carriage, in combination with a support rotatably disposed above the said carriage, a guide-way integral with said support, a slide adjustably inserted in said guide-way, a downwardly directed fork-shaped projection on said slide, a grinding wheel casing freely suspended in said fork-shaped projection, a grinding wheel rotatably supported in said casing, a tension spring acting on said grinding wheel casing to swing said casing in a direction for resiliently applying the grinding wheel against a file to be fixed on the carriage, means for swinging the support and thereby oscillate said grinding wheel on an arc conforming to the arc of the teeth of the file to be fixed on the carriage, and means for lifting the casing and the grinding wheel for a period corresponding to that of one half of each complete swinging movement of the support, the said last-named means consisting of a lever pivoted intermediate its ends one arm of said level being capable of engaging the said grinding wheel casing.

3. A machine according to claim 2 further comprising a stem carried by the grinding wheel casing, a first roller rotatably mounted on said stem, an arcuate runway carried by said one end of the level, spring means for maintaining the said first roller in continuous contact with said runway, a second roller rotatably mounted on the other end of said lever, and a rotatable disc having a circumferential cam acting on the said second roller during one half of each complete swinging movement of the said rotatable support.

4. In a machine for grinding and sharpening an arcuate-tooth file in which the file to be worked on is fixed on a carriage movable step by step on a working table disposed under a grinding wheel, the combination comprising a first power driven shaft, a second shaft rotatably and slidably disposed in a bearing, through which projects its free end, a first disc mounted on the said first shaft and a second disc mounted on the second shaft, a slide connecting the said disc whereby uniform rotation of the first disc causes the second disk to be swung around its centre, a guide-way fixed on the said free end of the second shaft, a slide adjustably inserted in said guide-way, a fork-shaped support projecting downward on the adjustable slide, a grinding wheel casing freely suspended in the fork-shaped support, a grinding wheel rotatably supported in said carrier, a tension spring fixed by one of its ends to the adjustable slide and fixed by its other end to the said casing at a point remote from the grinding wheel, a circumferential cam on the underface of the said first disc, a lever pivoted intermediate its ends, disposed below the disc and extending from one disc to the other, a roller mounted at each end of the lever, the roller mounted at the end of the lever disposed below the second disc being permanently in contact with the said second disc while the roller mounted at the other end being disposed in the path of the cam on the under face of said first disc.

References Cited in the file of this patent
UNITED STATES PATENTS

| | | |
|---|---|---|
| 2,212,999 | Faulder | Aug. 27, 1940 |
| 2,222,034 | Jackson | Nov. 19, 1940 |
| 2,375,703 | Swartzwelder | May 8, 1945 |
| 2,627,143 | Beyer | Feb. 3, 1953 |